United States Patent
Abe

(10) Patent No.: US 8,625,208 B2
(45) Date of Patent: Jan. 7, 2014

(54) IMAGE PICKUP OPTICAL SYSTEM AND IMAGE PICKUP APPARATUS USING THE SAME

(75) Inventor: Kenichiro Abe, Hino (JP)

(73) Assignee: Olympus Corporation, Tokyo (JP)

( * ) Notice: Subject to any disclaimer, the term of this patent is extended or adjusted under 35 U.S.C. 154(b) by 120 days.

(21) Appl. No.: 13/153,520

(22) Filed: Jun. 6, 2011

(65) Prior Publication Data

US 2011/0304928 A1 Dec. 15, 2011

(30) Foreign Application Priority Data

Jun. 14, 2010 (JP) ................. 2010-134895

(51) Int. Cl.
*G02B 9/60* (2006.01)
*G02B 13/04* (2006.01)

(52) U.S. Cl.
CPC ....................... *G02B 9/60* (2013.01)
USPC .......................... 359/764; 359/753

(58) Field of Classification Search
USPC .............. 359/658–659, 713–714, 754–757, 359/763–754, 753, 764; 348/335, 340, 348/E5.024
See application file for complete search history.

(56) References Cited

U.S. PATENT DOCUMENTS

| | | | | |
|---|---|---|---|---|
| 2010/0214467 A1* | 8/2010 | Ohtsu | | 348/345 |
| 2010/0253829 A1* | 10/2010 | Shinohara | | 348/340 |
| 2011/0013069 A1* | 1/2011 | Chen | | 348/335 |
| 2011/0310287 A1* | 12/2011 | Ohtsu | | 348/340 |
| 2012/0229920 A1* | 9/2012 | Otsu et al. | | 359/764 |

FOREIGN PATENT DOCUMENTS

JP 2007-264180 A 10/2007
JP 2007-298572 A 11/2007

* cited by examiner

*Primary Examiner* — William Choi
(74) *Attorney, Agent, or Firm* — Brosemer, Kolefas & Associates, LLC

(57) ABSTRACT

An image pickup optical system of the present invention comprises, in order from an object side, a first lens having a positive refractive power, a second lens having a negative refractive power, a third lens having a positive refractive power, a fourth lens having a positive refractive power, a fifth lens having a negative refractive power, which is formed into a meniscus shape facing its concave surface toward the object side, and an aperture located on the most object side. Thus, there can be provided an image pickup optical system and an image pickup apparatus having the same, in which the maximum effective lens aperture is small and various aberrations are corrected properly.

13 Claims, 17 Drawing Sheets

IMAGE PICKUP OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2010-134895 filed on Jul. 14, 2010; the entire contents of which are incorporated herein by reference.

BACKGROUND OF THE INVENTION

1. Field of the Invention

The present invention relates to an image pickup optical system and an image pickup apparatus using the same.

2. Description of the Related Art

With the recent demand for thinner cellular phones, camera modules are required to make the length of the optical system along an optical axis thinner to the utmost limit.

Further, as the image pickup devices have grown in size and resolution in recent years, lenses having high resolving power have been required. To meet this requirement, there is proposed a single focus optical system composed of five aspheric lenses.

SUMMARY OF THE INVENTION

An image pickup optical system of the present invention comprises, in order from an object side, a first lens having a positive refractive power, a second lens having a negative refractive power, a third lens having a a positive refractive power, a fourth lens having a positive refractive power, a fifth lens having a negative refractive power, which is formed into a meniscus shape facing its concave surface toward the object side, and an aperture located on the most object side.

An image pickup apparatus of the present invention comprises, the above image pickup optical system, and an electronic image pickup device having an image pickup plane, wherein it is desired that the following conditional expression be satisfied:

$$15° < \alpha i < 30° \quad (7)$$

where $\alpha i$ is the angle of incidence of a principle ray onto the image pickup plane in the case of the maximum image height.

BRIEF DESCRIPTION OF THE DRAWING

FIG. 17A is a front view of a cellular phone 400, FIG. 17B is a side view, and FIG. 17C is a sectional view of a photographing optical system 405.

DETAILED DESCRIPTION OF THE INVENTION

Figure 1:
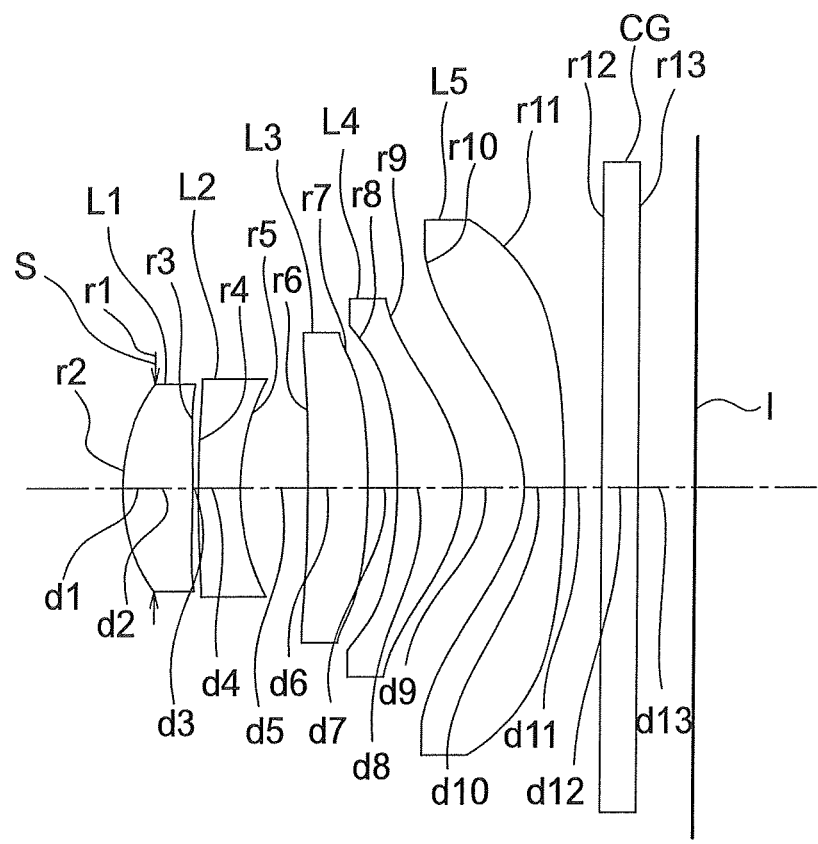
FIG. 1 is a sectional view taken along the optical axis to show the optical structure of an image pickup optical system according to Example 1 of the present invention when focusing on an object point at infinity.

Before describing examples, the operation and effects of an image pickup optical system of a preferred embodiment will be described.

The image pickup optical system of the embodiment comprises, in order from an object side, a first lens having a positive refractive power, a second lens having a negative refractive power, a third lens having a positive refractive power, a fourth lens having a positive refractive power, a fifth lens having a negative refractive power, which is formed into a meniscus shape facing its concave surface toward the object side, and an aperture located on the most object side.

Such a structure can lead to positioning the position of a principal point on the object side of the optical system. This can make the entire length short enough with respect to the focal length, thus achieving reduction in entire length.

Since the fourth lens is made positive, the divergence of an off-axis light beam can be suppressed in the fourth lens. This can make the diameter of the final lens small while ensuring the telecentricity of the optical system.

The fifth lens is formed into a meniscus shape facing its concave surface toward the object side. Since this can make small angles of the off-axis light beam incident on the lens surfaces of both the object side surface and the surface on the image plane side, the occurrence of coma can be suppressed.

The aperture is located on the most object side. This allows an exit pupil to be away from the image plane, so that the effective lens aperture can be made small while ensuring the telecentricity of the optical system.

In the examples to be described later, the aperture is located on a more object side than the image side surface of the first lens, more specifically, between the object side surface and the image side surface of the first lens. Such an aperture position shall be included in the expression that "the aperture is located on the most object side."

It is desired that the image pickup optical system of the embodiment should satisfy the following conditional expression (A):

$$\phi max/2Y < 1.78 \quad (A)$$

where
$\phi max$ is the maximum effective lens aperture, and
Y is the maximum image height.

The conditional expression (A) is to define the maximum effective lens aperture.

It is also desired that the image pickup optical system of the embodiment should satisfy the following conditional expression (B):

$$0.01 < 1/v2 - 1/v1 < 0.03 \quad (B)$$

where
v1 is Abbe constant (nd1−1)/(nF1−nC1) of the first lens,
v2 is Abbe constant (nd2−1)/(nF2−nC2) of the second lens,
nd1, nC1, and nF1 are refractive indexes of the first lens for d-line, C-line, F-line, respectively, and
nd2, nC2, and nF2 are refractive indexes of the second lens for d-line, C-line, F-line, respectively.

The conditional expression (B) is a relational expression regarding the Abbe constants of the first lens and the second lens. If the conditional expression (B) is satisfied, chromatic aberrations can be corrected properly.

Further, it is desired that the image pickup optical system of the embodiment should satisfy the following conditional expression (1):

$$-4.2 < f/f5 < -0.8 \quad (1)$$

where
f5 is the focal length of the fifth lens, and
f is the focal length of the entire image pickup optical system.

If the conditional expression (1) is satisfied, various aberrations, especially chromatic aberration of magnification, can be corrected while making the entire length shorter.

If the upper limit of conditional expression (1) is exceeded, the negative refractive power of the fifth lens becomes small. This makes it difficult to locate the position of the principal point on the object side of the optical system, and hence to reduce the entire length.

On the other hand, If the lower limit of conditional expression (1) is exceeded, the negative refractive power of the fifth lens in the lens system becomes large. This makes it difficult to correct various aberrations, especially chromatic aberration of magnification, produced between the first lens and the fourth lens.

It is preferred to satisfy the following conditional expression (1') instead of the conditional expression (1):

$$-3.1 < f/f5 < -1.1 \quad (1')$$

It is more preferred to satisfy the following conditional expression (1") instead of the conditional expression (1):

$$-2.7 < f/f5 < -1.3 \quad (1'')$$

Further, it is desired that the image pickup optical system of the embodiment should satisfy the following conditional expression (2):

$$-2.7 < (r10 + r11)/(r10 - r11) < -0.6 \quad (2)$$

where
r10 is the paraxial radius of curvature of the object side surface of the fifth lens, and
r11 is the paraxial radius of curvature of the image side surface of the fifth lens.

If the conditional expression (2) is satisfied, distance between the fifth lens (image side surface) and the image pickup plane can be ensured sufficiently even in a peripheral part of the image pickup plane. Even if the effective aperture of the fifth lens is made small while keeping the telecentricity of the optical system, coma can be corrected properly.

If the lower limit of conditional expression (2) is exceeded, the negative power of the object side surface of the fifth lens becomes too large. This causes the position of the principal point of the fifth lens to get close to the object side, and hence the back focus length becomes short. As a result, it becomes difficult to reduce the effective aperture of the fifth lens while keeping the telecentricity of the optical system.

If the upper limit of conditional expression (2) is exceeded, the radius of curvature of the image side surface of the fifth lens becomes large, and hence the image side surface of the fifth lens, especially the position of the surface in the peripheral part, cannot be moved to the object side. This makes the distance between the image side surface and the image pickup plane short in the peripheral part of the image pickup plane. As a result, it becomes difficult to make the effective aperture of the fifth lens small while keeping the telecentricity of the optical system.

Further, If the upper limit of conditional expression (2) is exceeded, the radius of curvature of the image side surface of the fifth lens becomes too large. This results in a large angle of incidence of an off-axis light beam onto the image side surface of the fifth lens, and hence makes it difficult to correct coma.

It is preferred to satisfy the following conditional expression (2') instead of the conditional expression (2):

$$-2 < (r10 + r11)/(r10 - r11) < -0.8 \quad (2')$$

It is more preferred to satisfy the following conditional expression (2") instead of the conditional expression (2):

$$-1.7 < (r10 + r11)/(r10 - r11) < -0.9 \quad (2'')$$

Further, it is desired that the first lens be a biconvex lens in the image pickup optical system of the embodiment.

If the first lens is formed as a biconvex shape, the occurrence of coma is reduced, so that the optical system can be shortened.

Further, it is desired that the image pickup optical system of the embodiment should satisfy the following conditional expression (3):

$$-1 < (r2 + r3)/(r2 - r3) < -0.59 \quad (3)$$

where
r2 is the paraxial radius of curvature of the object side surface of the first lens, and
r3 is the paraxial radius of curvature of the image side surface of the first lens.

The conditional expression (3) is an expression for defining the shape of the first lens.

If the lower limit of conditional expression (3) is exceeded, the radius of curvature of the object side surface of the first lens becomes small. This results in a steep angle of incidence of a light beam onto the object side surface of the first lens. Therefore, coma that occurs in the first lens becomes large.

Particularly, if the conditional expression (A) is satisfied and if the lower limit of conditional expression (3) is exceeded, it becomes difficult to correct this coma in the third lens to the fifth lens, making it difficult to retain high performance.

When the upper limit to the conditional expression (3) is exceeded, since the radius of curvature of the object side surface of the first lens becomes large, the radius of curvature of the image side surface becomes small. This makes it difficult to move the position of the principal point in the entire optical system to the object side. As a result, it becomes difficult to shorten the entire optical system.

It is preferred to satisfy the following conditional expression (3') instead of the conditional expression (3):

$$-0.95<(r2+r3)/(r2-r3)<-0.61 \tag{3'}$$

It is more preferred to satisfy the following conditional expression (3") instead of the conditional expression (3):

$$-0.9<(r2+r3)/(r2-r3)<-0.7 \tag{3"}$$

Further, it is desired that the image pickup optical system of the embodiment be such that the second lens is a meniscus lens facing its convex surface toward the object side.

If the second lens is formed into a meniscus shape facing its convex surface toward the object side, chromatic aberration can be corrected properly, and off-axis aberrations such as coma and curvature of field can be corrected properly.

Further, it is desired that the image pickup optical system of the embodiment should satisfy the following conditional expression (4):

$$1<(r4+r5)/(r4-r5)<2 \tag{4}$$

where
r4 is the paraxial radius of curvature of the object side surface of the second lens, and
r5 is the paraxial radius of curvature of the image side surface of the second lens.

The conditional expression (4) is an expression for defining the shape of the second lens.

If the lower limit of conditional expression (4) is exceeded, the radius of curvature of the image side surface of the second lens becomes large. This makes it impossible to make the exit angle of a light beam from the second lens large. As a result, since the difference in the height of the off-axis light beam between the second lens and the third lens becomes small, it becomes difficult to correct coma and high-order curvature of field.

If the upper limit of conditional expression (4) is exceeded, the position of the principal point of the second lens gets too close to the image side. This makes the distance between the principal plane of the first lens and the second lens too large. As a result, it becomes difficult to correct both the longitudinal chromatic aberration and the chromatic aberration of magnification.

When the conditional expression (B) is satisfied and the conditional expression (4) is not satisfied (the lower limit is exceeded or the upper limit is exceeded), the above-mentioned corrections become more difficult.

It is preferred to satisfy the following conditional expression (4') instead of the conditional expression (4):

$$1.1<(r4+r5)/(r4-r5)<1.9 \tag{4'}$$

It is more preferred to satisfy the following conditional expression (4") instead of the conditional expression (4):

$$1.2<(r4+r5)/(r4-r5)<1.7 \tag{4"}$$

Further, it is desired that the image pickup optical system of the embodiment be such that the fourth lens is a meniscus lens facing its concave surface toward the object side.

If the fourth lens is formed into a meniscus shape facing its concave surface toward the object side, the occurrence of coma can be reduced.

Further, it is desired that the image pickup optical system of the embodiment should satisfy the following conditional expression (5):

$$1<(r8+r9)/(r8-r9)<2.7 \tag{5}$$

where
r8 is the paraxial radius of curvature of the object side surface of the fourth lens, and
r9 is the paraxial radius of curvature of the image side surface of the fourth lens.

If the conditional expression (5) is satisfied, the angles of incidence of a light beam onto the object side and image side surfaces of the fourth lens can be minimized. As a result, the coma can be corrected properly, and hence shortening can be achieved while keeping the telecentricity of the optical system.

If the lower limit of conditional expression (5) is exceeded, the radii of curvature of the object side surface and the image side surface of the fourth lens become too large. In this case, since the angles of incidence of the off-axis light beam onto the object side surface and the image side surface of the fourth lens become large, it becomes difficult to correct coma.

If the power of the fourth lens is kept constant, the above phenomenon becomes pronounced.

If the upper limit of conditional expression (5) is exceeded, the power of the image side surface of the fourth lens becomes too large. This results in a small exit angle from the fourth lens, and hence it becomes difficult to strike a balance between shortening of the entire length of the optical system and ensuring of the telecentricity.

It is preferred to satisfy the following conditional expression (5') instead of the conditional expression (5):

$$1.1<(r8+r9)/(r8-r9)<2.6 \tag{5'}$$

It is more preferred to satisfy the following conditional expression (5") instead of the conditional expression (5):

$$1.2<(r8+r9)/(r8-r9)<2.4 \tag{5"}$$

Further, it is desired that the image pickup optical system of the embodiment should satisfy the following conditional expression (6):

$$1.3<f3/f4<7.8 \tag{6}$$

where
f3 is the focal length of the third lens, and
f4 is the focal length of the fourth lens.

If the diameter of the fifth lens is not limited and its position can get close to the image side, the fourth lens can also be located on the image side. This can widen the distance between the third lens and the fourth lens. Therefore, even if the exit angle from the third lens is small, the difference between the exit position of the light beam in the third lens and the incidence position of the light beam in the fourth lens can be increased. As a result, the exit angle of the light beam can be gradually reduced using the fourth lens and the fifth lens.

If the conditional expression (6) is satisfied, the refractive power of the third lens and the refractive power of the fourth lens can be distributed properly. As a result, the telecentricity of the optical system can be ensured to reduce the deterioration of decentration sensitivity accompanied by shortening the optical length.

If the lower limit of conditional expression (6) is exceeded, the refractive power of the third lens becomes large. Then, when the off-axis light beam exits from the third lens, its exit angle becomes small. In such a case, the exit angle from the fourth lens or the fifth lens must be made larger to make this off-axis light beam comes into a focus on the peripheral part of the image pickup plane. As a result, the angle of the light beam incident on the peripheral part of the image pickup plane becomes large, making it difficult to avoid reduction in the amount of peripheral light.

In the image pickup optical system of the embodiment, the diameter of the fifth lens is largest. If the diameter of the fifth lens is reduced, it is required to locate the fifth lens as close to the object side as possible. However, if the fifth lens is located on the object side, since the fourth lens is also located on the object side, the distance between the third lens and the fourth lens becomes small. Therefore, as mentioned above, when the exit angle of the light beam from the third lens is small, the displacement of the light beam between the third lens and the fourth lens (the difference between the exit position of the light beam in the third lens and the incidence position of the light beam in the fourth lens) becomes small. As a result, the problem that the exit angle from the fourth lens or the fifth lens becomes large is further pronounced.

If the upper limit of conditional expression (6) is exceeded, the refractive power of the fourth lens becomes too large compared with that of the third lens. This is unfavorable because the decentration sensitivity of the fourth lens is increased.

It is preferred to satisfy the following conditional expression (6') instead of the conditional expression (6):

$$1.7 < f3/f4 < 5.8 \qquad (6')$$

It is more preferred to satisfy the following conditional expression (6") instead of the conditional expression (6):

$$2 < f3/f4 < 5 \qquad (6'')$$

Further, it is desired that the image pickup optical system of the embodiment be such that the first lens, the second lens, the third lens, the fourth lens, and the fifth lens in the image pickup optical system are all made of resin.

Use of resin can lead to providing an inexpensive image pickup lens.

An image pickup apparatus of the embodiment comprises the above-mentioned image pickup optical system, and an electronic image pickup device having an image pickup plane,
wherein the following conditional expression is satisfied:

$$15° < \alpha i < 30° \qquad (7)$$

where $\alpha i$ is the angle of incidence of a principle ray onto the image pickup plane in the case of the maximum image height.

The conditional expression (7) is to define an appropriate range of angles of incidence of a light beam exiting from the optical system onto the image pickup device.

When a CCD or the like is used as a solid-state image pickup device, if an off-axis light beam exiting from the optical system is incident at a large angle on (the normal of) the image pickup plane, the brightness of an image varies between the center part and the peripheral part. Further, if the angle of incidence onto the image pickup plane is small, this problem is solved but the entire length of the optical system becomes long. Therefore, it is desired that the conditional expression (7) be satisfied.

It is also desired that the image pickup apparatus of the embodiment should further comprise an autofocus mechanism integrated into the image pickup optical system.

If the autofocus mechanism is incorporated, focus can be achieved at all object distances.

Further, it is desired that the image pickup apparatus of the embodiment be such that the image pickup optical system and the electronic image pickup device are integrated as a unit.

If the electronic image pickup device is integrated as a unit, an optical image produced by the image pickup optical system can be converted to an electric signal. Further, an electronic image pickup device capable of reducing the variations of the image brightness caused by the angle $\alpha i$ between the center part and the peripheral part of the image can be selected to provide a compact, high-performance image pickup apparatus.

Examples of the image pickup optical system and the electronic image pickup apparatus of the embodiment will be described with reference to the accompanying drawings. Note that these examples are not intended to limit this invention. The positive or negative of the refractive power is based on the paraxial radius of curvature. Further, the aperture stop is located on the most object side. However, as mentioned above, the aperture stop is located on a more object side than the image side surface of the first lens, more specifically, between the object side surface and the image side surface of a first lens L1.

Next, an image pickup optical system according to Example 1 will be described. FIG. 1 is a sectional view taken along the optical axis to show the optical structure of an image pickup optical system according to Example 1 when focusing on an object point at infinity.

Figure 2:
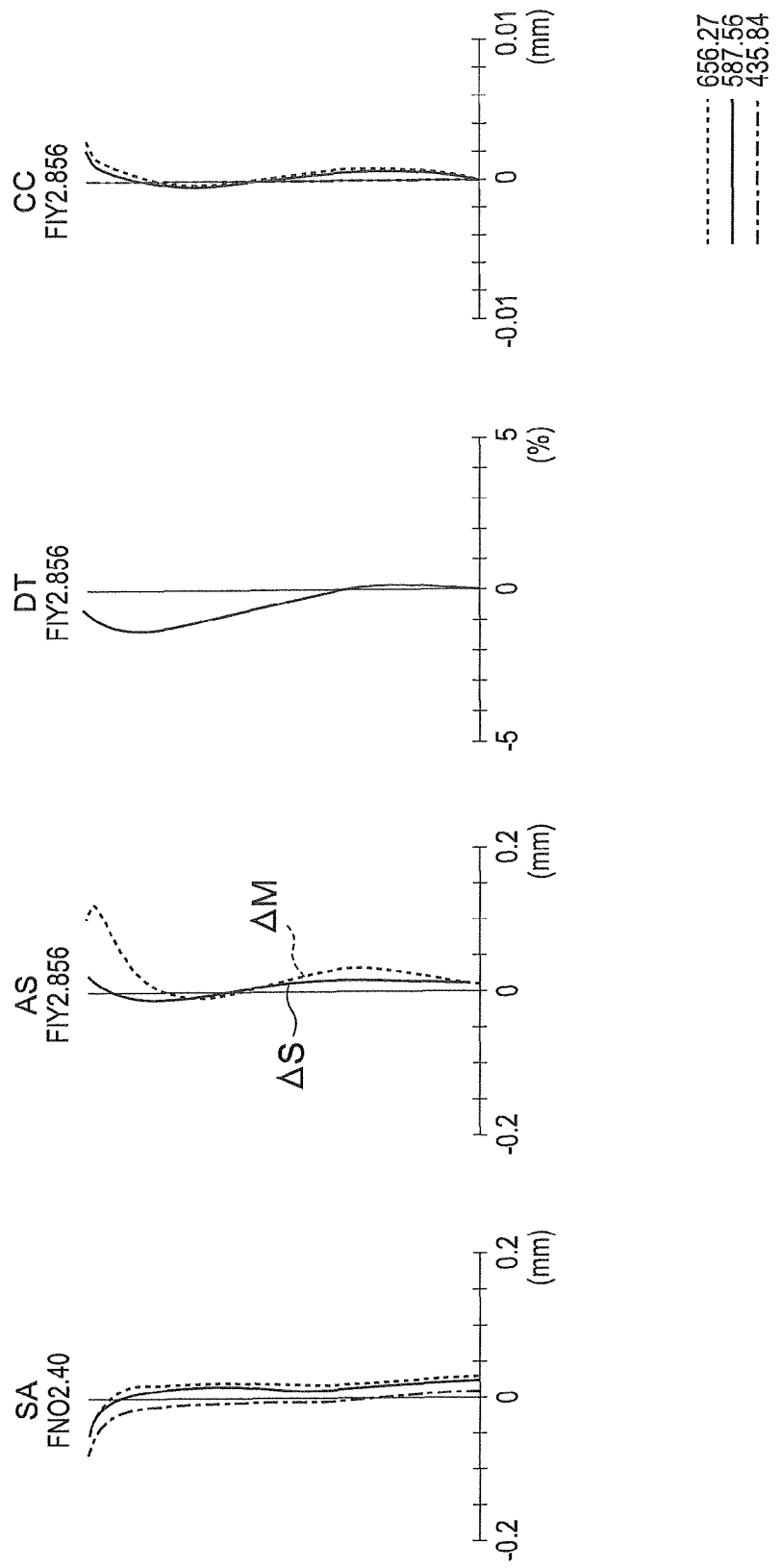
FIG. 2 is a diagram showing spherical aberration (SA), astigmatism (AS), distortion (DT), and chromatic aberration of magnification (CC) when the image pickup optical system according to Example 1 focuses on the object point at infinity.

FIG. 2 is a diagram showing spherical aberration (SA), astigmatism (AS), distortion (DT), and chromatic aberration of magnification (CC) when the image pickup optical system according to Example 1 focuses on the object point at infinity. Note that FIY is image height, and symbols in the aberration diagrams are commonly used in the other examples to be described later.

As shown in FIG. 1, the image pickup optical system of Example 1 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power. Note that, in all the examples to be described later, CG is a cover glass and I is the image pickup plane of the electronic image pickup device in the lens sectional views.

The first lens L1 is a biconvex positive lens. The second lens L2 is a negative meniscus lens facing its convex surface toward the object side. The third lens L3 is a positive meniscus lens facing its convex surface toward the image plane side. The fourth lens L4 is a positive meniscus lens facing its convex surface toward the image plane side. The fifth lens L5 is a negative meniscus lens facing its concave surface toward the object side.

Aspheric surfaces are provided on both sides of all the lenses from the first lens L1 to the fifth lens L5.

Figure 3:
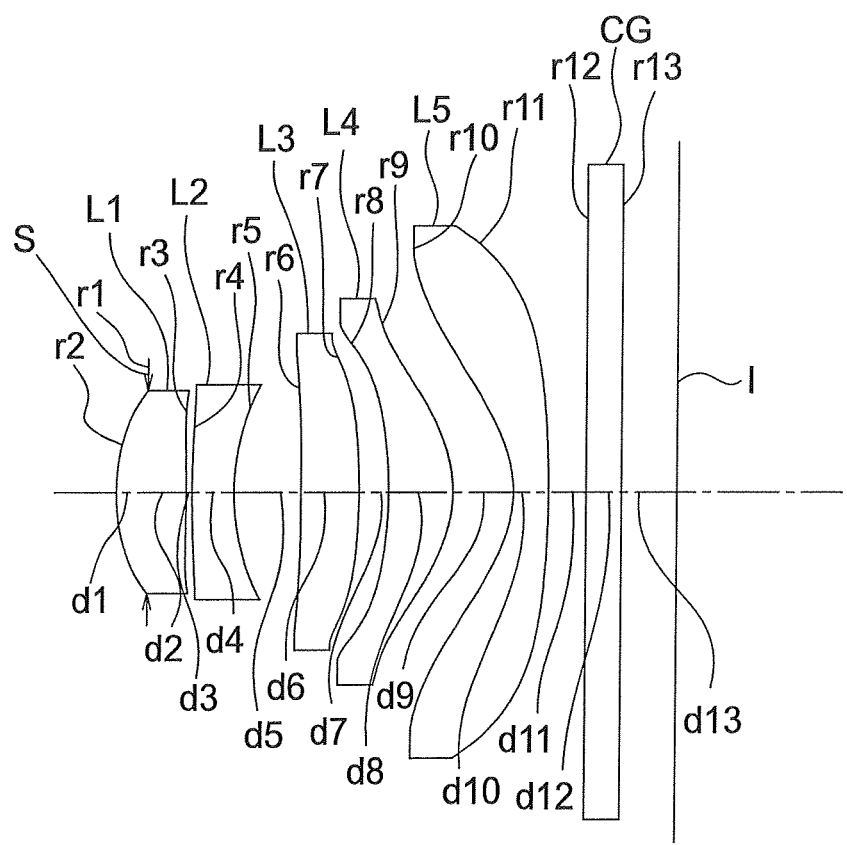
FIG. 3 is a sectional view taken along the optical axis to show the optical structure of an image pickup optical system according to Example 2 of the present invention when focusing on an object point at infinity.

Next, an image pickup optical system according to Example 2 will be described. FIG. 3 is a sectional view taken along the optical axis to show the optical structure of an image pickup optical system according to Example 2 when focusing on an object point at infinity.

Figure 4:
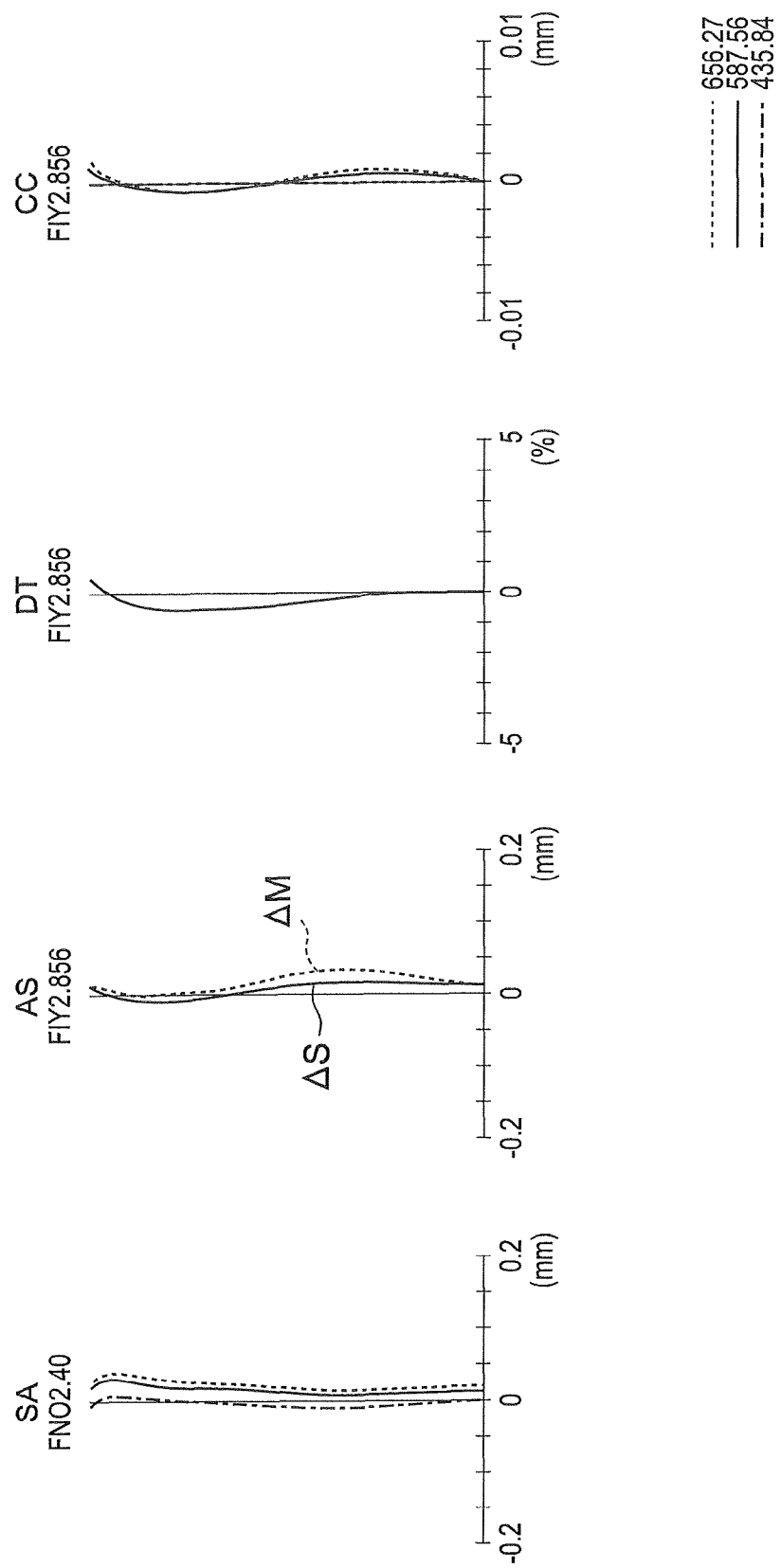
FIG. 4 is a diagram showing spherical aberration (SA), astigmatism (AS), distortion (DT), and chromatic aberration of magnification (CC) when the image pickup optical system according to Example 2 focuses on the object point at infinity.

FIG. 4 is a diagram showing spherical aberration (SA), astigmatism (AS), distortion (DT), and chromatic aberration of magnification (CC) when the image pickup optical system according to Example 2 focuses on the object point at infinity.

As shown in FIG. 3, the image pickup optical system of Example 2 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a positive meniscus lens facing its convex surface toward the image plane side. The fourth lens L4 is a positive meniscus lens facing its convex surface toward the image plane side. The fifth lens L5 is a negative meniscus lens facing its concave surface toward the object side.

Aspheric surfaces are provided on both sides of all the lenses from the first lens L1 to the fifth lens L5.

Figure 5:
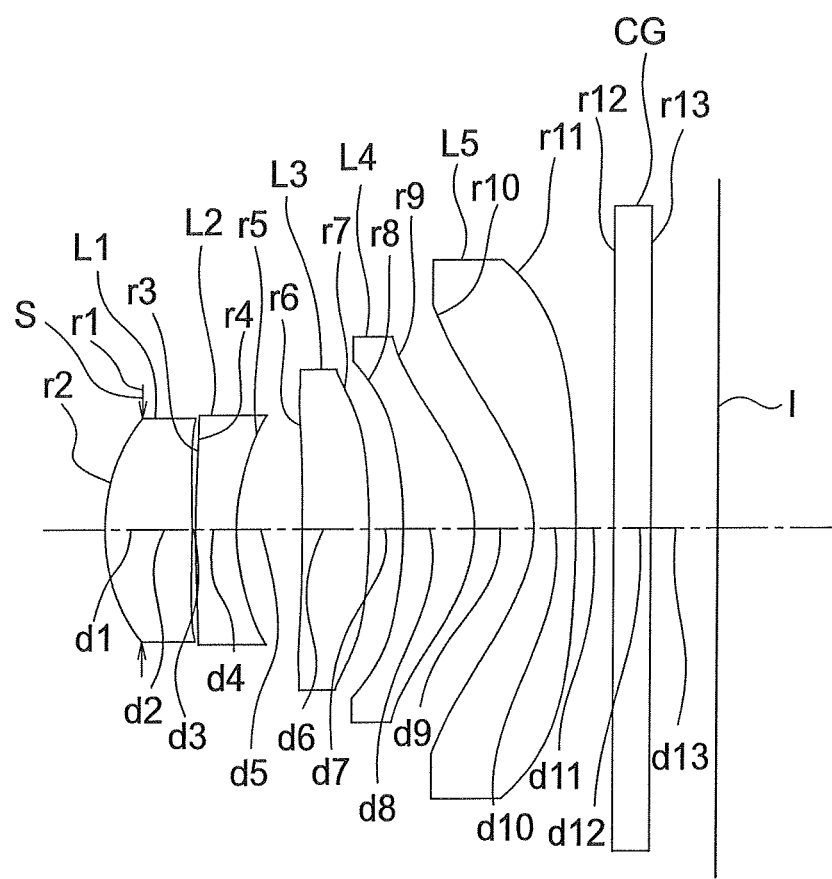
FIG. 5 is a sectional view taken along the optical axis to show the optical structure of an image pickup optical system according to Example 3 of the present invention when focusing on an object point at infinity.

Next, an image pickup optical system according to Example 3 will be described. FIG. 5 is a sectional view taken along the optical axis to show the optical structure of an image pickup optical system according to Example 3 when focusing on an object point at infinity.

Figure 6:
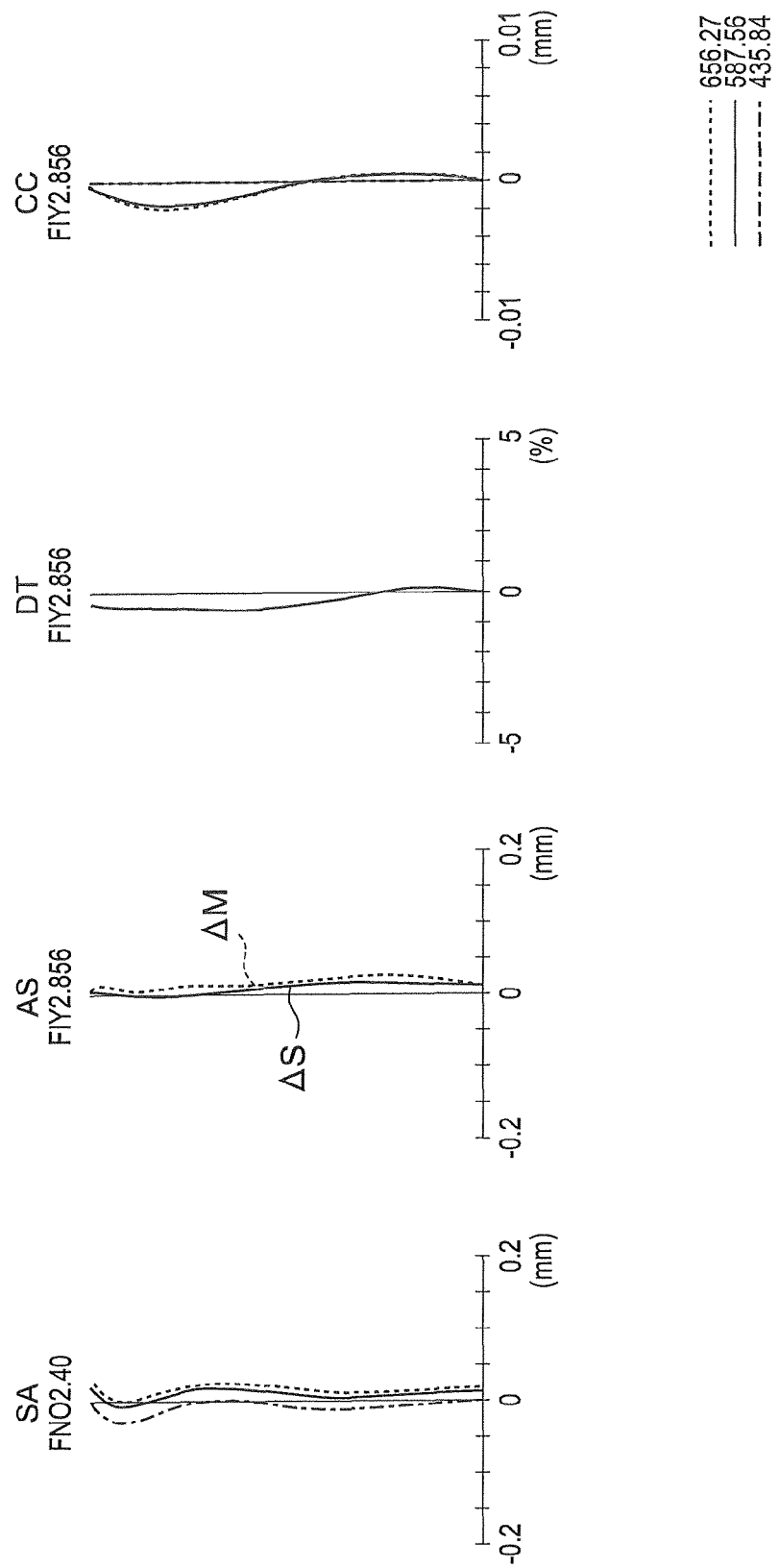
FIG. 6 is a diagram showing spherical aberration (SA), astigmatism (AS), distortion (DT), and chromatic aberration of magnification (CC) when the image pickup optical system according to Example 3 focuses on the object point at infinity.

FIG. 6 is a diagram showing spherical aberration (SA), astigmatism (AS), distortion (DT), and chromatic aberration of magnification (CC) when the image pickup optical system according to Example 3 focuses on the object point at infinity.

As shown in FIG. 5, the image pickup optical system of Example 3 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a positive meniscus lens facing its convex surface toward the image plane side. The fourth lens L4 is a positive meniscus lens facing its convex surface toward the image plane side. The fifth lens L5 is a negative meniscus lens facing its concave surface toward the object side.

Aspheric surfaces are provided on both sides of all the lenses from the first lens L1 to the fifth lens L5.

Figure 7:
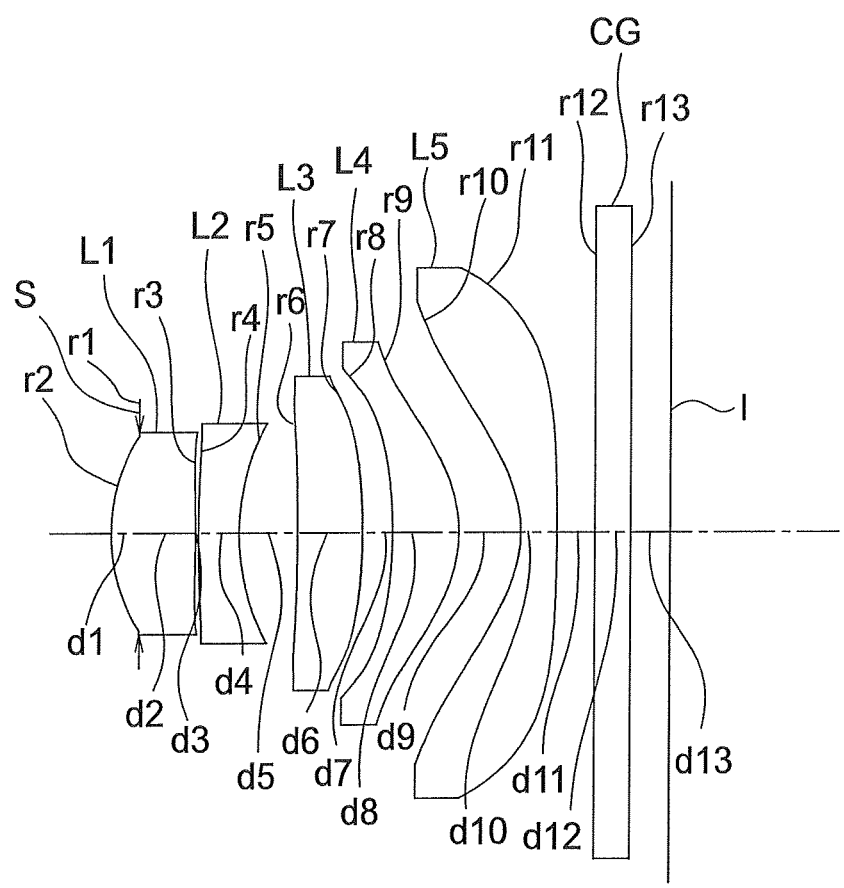
FIG. 7 is a sectional view taken along the optical axis to show the optical structure of an image pickup optical system according to Example 4 of the present invention when focusing on an object point at infinity.

Next, an image pickup optical system according to Example 4 will be described. FIG. 7 is a sectional view taken along the optical axis to show the optical structure of an image pickup optical system according to Example 4 when focusing on an object point at infinity.

Figure 8:
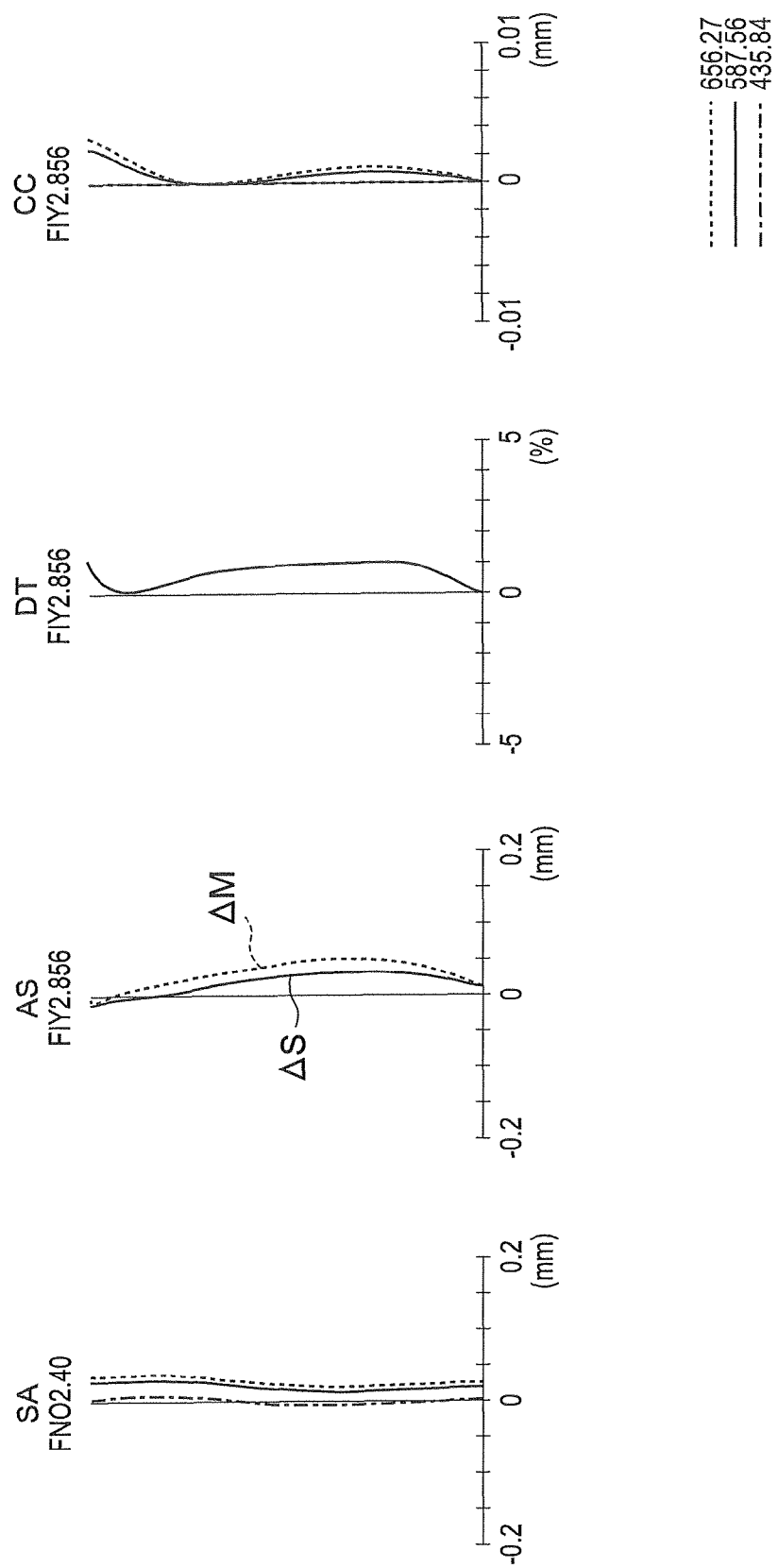
FIG. 8 is a diagram showing spherical aberration (SA), astigmatism (AS), distortion (DT), and chromatic aberration of magnification (CC) when the image pickup optical system according to Example 4 focuses on the object point at infinity.

FIG. 8 is a diagram showing spherical aberration (SA), astigmatism (AS), distortion (DT), and chromatic aberration of magnification (CC) when the image pickup optical system according to Example 4 focuses on the object point at infinity.

As shown in FIG. 7, the image pickup optical system of Example 4 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a positive meniscus lens facing its convex surface toward the image plane side. The fourth lens L4 is a positive meniscus lens facing its convex surface toward the image plane side. The fifth lens L5 is a negative meniscus lens facing its concave surface toward the object side.

Aspheric surfaces are provided on both sides of all the lenses from the first lens L1 to the fifth lens L5.

Figure 9:
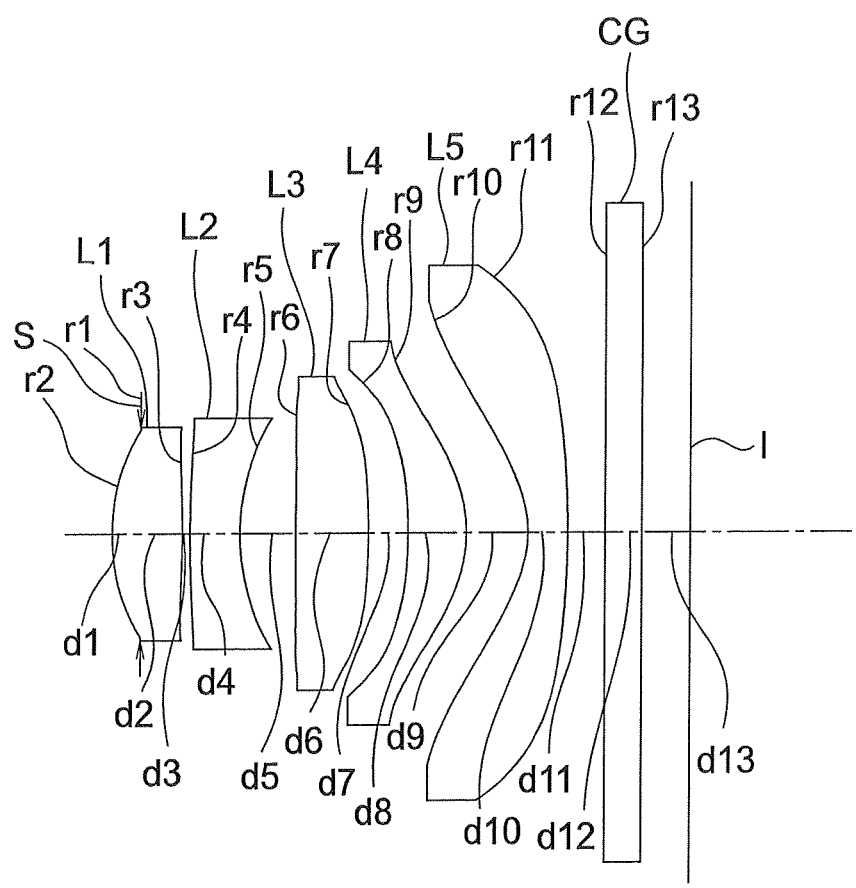
FIG. 9 is a sectional view taken along the optical axis to show the optical structure of an image pickup optical system according to Example 5 of the present invention when focusing on an object point at infinity.

Next, an image pickup optical system according to Example 5 will be described. FIG. 9 is a sectional view taken along the optical axis to show the optical structure of an image pickup optical system according to Example 5 when focusing on an object point at infinity.

Figure 10:
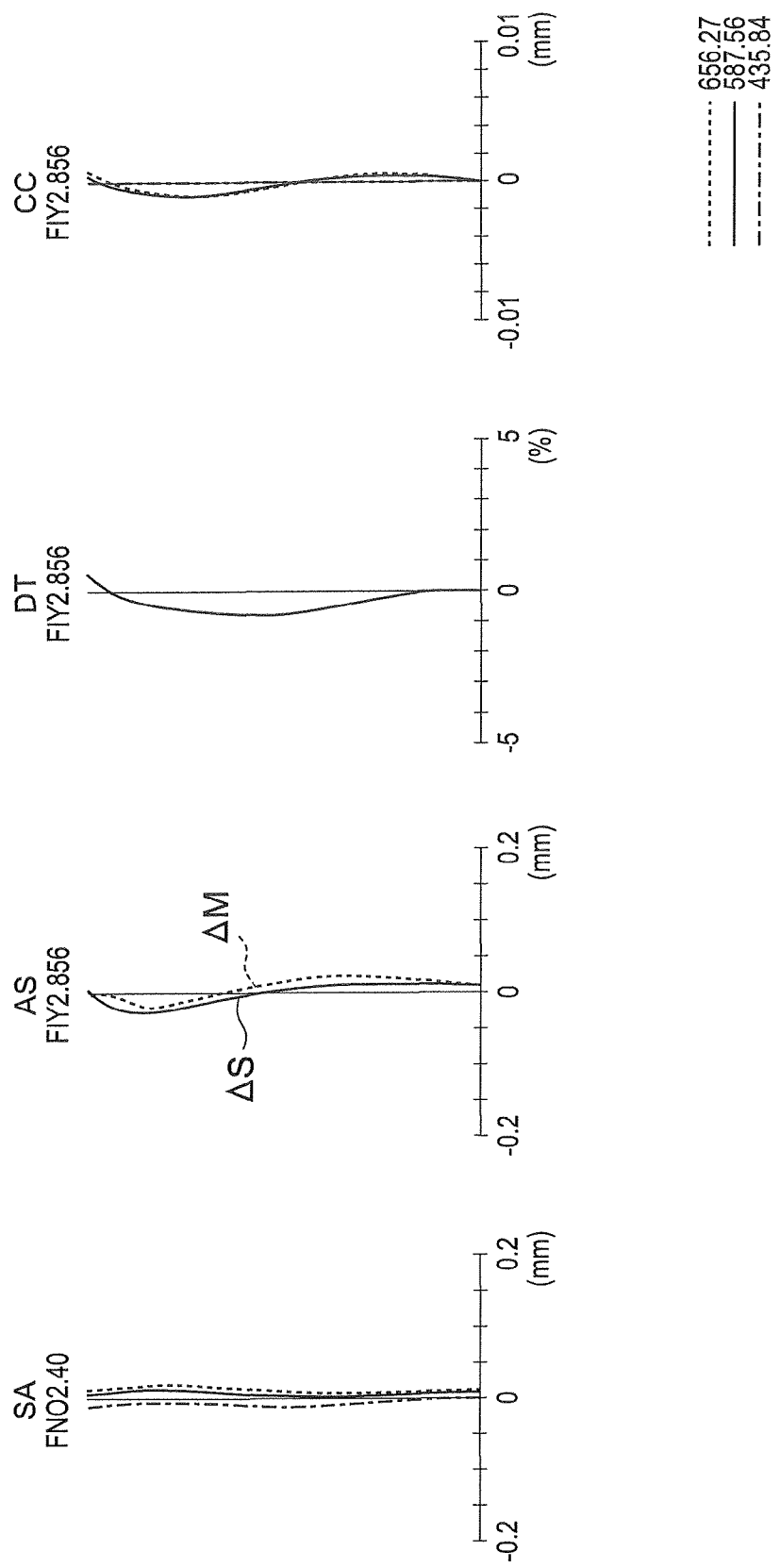
FIG. 10 is a diagram showing spherical aberration (SA), astigmatism (AS), distortion (DT), and chromatic aberration of magnification (CC) when the image pickup optical system according to Example 5 focuses on the object point at infinity.

FIG. 10 is a diagram showing spherical aberration (SA), astigmatism (AS), distortion (DT), and chromatic aberration of magnification (CC) when the image pickup optical system according to Example 5 focuses on the object point at infinity.

As shown in FIG. 9, the image pickup optical system of Example 5 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a negative meniscus lens facing its concave surface toward the object side.

Aspheric surfaces are provided on both sides of all the lenses from the first lens L1 to the fifth lens L5.

Numerical data of each embodiment described above is shown below. Apart from symbols described above, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. Further, $F_{NO}$ denotes an F number, f denotes a focal length of the entire zoom lens system, BF denotes a back focus.

When z is let to be an optical axis with a direction of traveling of light as a positive (direction), and y is let to be in a direction orthogonal to the optical axis, a shape of the aspheric surface is described by the following expression.

$$z = (y^2/r)/[1 + \{1-(K+1)(y/r)^2\}^{1/2}] + A_4 y^4 + A_6 y^6 + A_8 y^8 + A_{10} y^{10} + A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'. Symbols in the numerals data are common in the numeral data of each of examples.

Further "*" means that the surface is an aspheric surface.

EXAMPLE 1

| Unit mm | | | | |
|---|---|---|---|---|
| Surface data | | | | |
| Surface no. | r | d | nd | vd |
| Object plane | ∞ | ∞ | | |
| 1(Stop) | ∞ | −0.27 | | |

-continued

Unit mm

| | | | | |
|---|---|---|---|---|
| 2* | 1.573 | 0.59 | 1.53368 | 55.90 |
| 3* | −12.787 | 0.05 | | |
| 4* | 8.861 | 0.35 | 1.61420 | 25.59 |
| 5* | 1.809 | 0.56 | | |
| 6* | −46.595 | 0.50 | 1.54455 | 55.96 |
| 7* | −5.081 | 0.24 | | |
| 8* | −3.878 | 0.54 | 1.54455 | 55.96 |
| 9* | −1.167 | 0.52 | | |
| 10* | −0.974 | 0.33 | 1.53368 | 55.90 |
| 11* | −7.346 | 0.31 | | |
| 12 | ∞ | 0.30 | 1.56100 | 56.10 |
| 13 | ∞ | 0.46 | | |
| Image plane | | | | |

Aspherical surface data

2nd surface $k = 0.266$
$A4 = 7.59525e-03, A6 = -1.02001e-02, A8 = 3.72829e-02,$
$A10 = 6.21358e-04, A12 = -4.57308e-03,$
$A14 = -5.46749e-03, A16 = 4.18012e-02$ 3rd surface $k = -364.435$
$A4 = 6.15772e-02, A6 = -4.40576e-02, A8 = 7.68822e-02,$
$A10 = 7.17069e-03, A12 = 3.44303e-02,$
$A14 = 6.83276e-02, A16 = -7.11259e-02$ 4th surface $k = -148.671$
$A4 = 2.70744e-02, A6 = -8.95031e-02, A8 = 1.07982e-01,$
$A10 = -3.11827e-02, A12 = -2.40581e-02,$
$A14 = -5.78447e-02, A16 = 6.54972e-02$ 5th surface $k = 1.433$
$A4 = -7.56908e-02, A6 = 4.50299e-02, A8 = -6.01936e-02,$
$A10 = 2.72752e-03, A12 = -1.41299e-02,$
$A14 = -8.03337e-03, A16 = 3.55074e-02$ 6th surface $k = -499.563$
$A4 = -1.95292e-02, A6 = -3.12110e-02, A8 = 3.93990e-02,$
$A10 = -7.99456e-03, A12 = 5.59480e-04,$
$A14 = 7.83810e-04, A16 = -2.26466e-03$ 7th surface $k = -3.689$
$A4 = 1.21945e-02, A6 = -5.69952e-02, A8 = -1.49426e-02,$
$A10 = 1.89989e-02, A12 = 4.70792e-04,$
$A14 = 1.38594e-04, A16 = -2.70536e-05$ 8th surface $k = 0.270$
$A4 = -6.00844e-02, A6 = 9.17760e-02, A8 = -1.06396e-01,$
$A10 = 3.56432e-02, A12 = -2.83196e-03,$
$A14 = 1.94412e-04, A16 = 1.98680e-04$ 9th surface $k = -0.580$
$A4 = 1.97019e-02, A6 = 7.15816e-02, A8 = -1.78058e-02,$
$A10 = 2.34966e-03, A12 = 1.35898e-04,$
$A14 = 1.98586e-05, A16 = -1.63933e-05$ 10th surface $k = -1.632$
$A4 = 5.16824e-02, A6 = -7.76401e-03, A8 = 8.56178e-04,$
$A10 = 1.20306e-04, A12 = -2.75987e-05,$
$A14 = 7.57847e-07, A16 = -1.87768e-07$ -continued Unit mm 11th surface $k = -261.458$
$A4 = -2.49668e-02, A6 = 2.22493e-03, A8 = -8.69234e-04,$
$A10 = 2.89833e-05, A12 = 9.64007e-06,$
$A14 = -1.21306e-06, A16 = 2.29917e-08$

| | |
|---|---|
| BF (in air) | 0.98 |
| Lens total length (in air) | 4.66 |
| Total system focal length | 4.09 |

EXAMPLE 2

Unit mm

Surface data

| Surface no. | r | d | nd | vd |
|---|---|---|---|---|
| Object plane | ∞ | ∞ | | |
| 1(Stop) | ∞ | −0.27 | | |
| 2* | 1.572 | 0.59 | 1.53368 | 55.90 |
| 3* | −12.666 | 0.05 | | |
| 4* | 8.842 | 0.35 | 1.61420 | 25.59 |
| 5* | 1.810 | 0.57 | | |
| 6* | −45.229 | 0.50 | 1.54455 | 55.96 |
| 7* | −5.119 | 0.25 | | |
| 8* | −3.877 | 0.54 | 1.54455 | 55.96 |
| 9* | −1.167 | 0.51 | | |
| 10* | −0.977 | 0.30 | 1.53368 | 55.90 |
| 11* | −7.815 | 0.31 | | |
| 12 | ∞ | 0.30 | 1.56100 | 56.10 |
| 13 | ∞ | 0.48 | | |
| Image plane | | | | |

Aspherical surface data

2nd surface $k = 0.266$
$A4 = 7.63435e-03, A6 = -1.01217e-02, A8 = 3.73471e-02,$
$A10 = 5.92083e-04, A12 = -4.76977e-03,$
$A14 = -5.93880e-03, A16 = 4.08900e-02$ 3rd surface $k = -388.712$
$A4 = 6.15087e-02, A6 = -4.42480e-02, A8 = 7.68094e-02,$
$A10 = 7.36007e-03, A12 = 3.50737e-02,$
$A14 = 6.97326e-02, A16 = -6.84581e-02$ 4th surface $k = -156.576$
$A4 = 2.70040e-02, A6 = -8.95198e-02, A8 = 1.07800e-01,$
$A10 = -3.17081e-02, A12 = -2.51934e-02,$
$A14 = -6.00225e-02, A16 = 6.15611e-02$ 5th surface $k = 1.427$
$A4 = -7.59622e-02, A6 = 4.50272e-02, A8 = -5.96818e-02,$
$A10 = 3.89510e-03, A12 = -1.24254e-02,$
$A14 = -6.37859e-03, A16 = 3.57909e-02$ 6th surface $k = -389.643$
$A4 = -1.96419e-02, A6 = -3.10725e-02, A8 = 3.93364e-02,$
$A10 = -8.01745e-03, A12 = 5.74512e-04,$
$A14 = 7.97846e-04, A16 = -2.25615e-03$ -continued Unit mm 7th surface k = −3.938
A4 = 1.24201e−02, A6 = −5.68043e−02, A8 = −1.48838e−02,
A10 = 1.90043e−02, A12 = 4.61828e−04,
A14 = 1.32554e−04, A16 = −3.01379e−05

8th surface k = 0.248
A4 = −5.99265e−02, A6 = 9.15381e−02, A8 = −1.06458e−01,
A10 = 3.56322e−02, A12 = −2.82329e−03,
A14 = 2.18198e−04, A16 = 2.59565e−04

9th surface k = −0.579
A4 = 1.96900e−02, A6 = 7.15887e−02, A8 = −1.78238e−02,
A10 = 2.34471e−03, A12 = 1.35879e−04,
A14 = 1.99978e−05, A16 = −1.62906e−05

10th surface k = −1.634
A4 = 5.16322e−02, A6 = −7.78135e−03, A8 = 8.52855e−04,
A10 = 1.19547e−04, A12 = −2.78634e−05,
A14 = 6.32418e−07, A16 = −2.79468e−07

11th surface k = −220.712
A4 = −2.43054e−02, A6 = 2.27473e−03, A8 = −8.63913e−04,
A10 = 2.93504e−05, A12 = 9.62884e−06,
A14 = −1.22479e−06, A16 = 2.00414e−08

| BF (in air) | 0.98 |
| Lens total length (in air) | 4.64 |
| Total system focal length | 4.08 |

EXAMPLE 3

Unit mm

Surface data

| Surface no. | r | d | nd | vd |
|---|---|---|---|---|
| Object plane | ∞ | ∞ | | |
| 1(Stop) | ∞ | −0.31 | | |
| 2* | 1.582 | 0.71 | 1.53368 | 55.90 |
| 3* | −14.734 | 0.03 | | |
| 4* | 9.403 | 0.34 | 1.61420 | 25.59 |
| 5* | 1.809 | 0.55 | | |
| 6* | −35.816 | 0.55 | 1.54455 | 55.96 |
| 7* | −5.163 | 0.28 | | |
| 8* | −3.994 | 0.58 | 1.54455 | 55.96 |
| 9* | −1.168 | 0.49 | | |
| 10* | −1.000 | 0.34 | 1.53368 | 55.90 |
| 11* | −9.685 | 0.31 | | |
| 12 | ∞ | 0.30 | 1.51633 | 64.14 |
| 13 | ∞ | 0.54 | | |
| Image plane | | | | |

Aspherical surface data

2nd surface k = 0.253
A4 = 7.90191e−03, A6 = −1.24560e−02, A8 = 3.07739e−02

3rd surface k = −571.080
A4 = 6.24043e−02, A6 = −4.81337e−02, A8 = 7.56600e−02

-continued

Unit mm

4th surface k = −191.722
A4 = 2.11486e−02, A6 = −8.74044e−02, A8 = 9.53130e−02,
A10 = −4.43688e−02

5th surface k = 1.395
A4 = −7.94063e−02, A6 = 4.11414e−02, A8 = −5.08455e−02,
A10 = 2.81381e−02

6th surface k = 0.000
A4 = −1.93547e−02, A6 = −2.80371e−02, A8 = 4.12299e−02,
A10 = −8.41747e−03

7th surface k = −3.638
A4 = 1.21548e−02, A6 = −5.72345e−02, A8 = −1.54447e−02,
A10 = 1.81783e−02

8th surface k = 1.119
A4 = −5.92396e−02, A6 = 9.68108e−02, A8 = −1.06343e−01,
A10 = 3.51129e−02, A12 = −2.24308e−03

9th surface k = −0.577
A4 = 1.81164e−02, A6 = 7.11401e−02, A8 = −1.79679e−02,
A10 = 2.28202e−03, A12 = 8.12810e−05

10th surface k = −1.706
A4 = 4.73943e−02, A6 = −8.21518e−03, A8 = 8.52622e−04,
A10 = 1.30597e−04, A12 = −1.79516e−05,
A14 = −3.82657e−06

11th surface k = −585.788
A4 = −2.20897e−02, A6 = 2.54385e−03, A8 = −8.23710e−04,
A10 = 3.35880e−05, A12 = 1.05741e−05, A14 = −1.46047e−06

| BF (in air) | 1.05 |
| Lens total length (in air) | 4.94 |
| Total system focal length | 4.37 |

EXAMPLE 4

Unit mm

Surface data

| Surface no. | r | d | nd | vd |
|---|---|---|---|---|
| Object plane | ∞ | ∞ | | |
| 1(Stop) | ∞ | −0.23 | | |
| 2* | 1.554 | 0.70 | 1.53368 | 55.90 |
| 3* | −12.927 | 0.02 | | |
| 4* | 8.964 | 0.34 | 1.61420 | 25.59 |
| 5* | 1.816 | 0.49 | | |
| 6* | −50.568 | 0.55 | 1.54455 | 55.96 |
| 7* | −5.071 | 0.25 | | |
| 8* | −4.044 | 0.56 | 1.54455 | 55.96 |
| 9* | −1.167 | 0.52 | | |

-continued

Unit mm

| | | | | |
|---|---|---|---|---|
| 10* | −1.032 | 0.30 | 1.53368 | 55.90 |
| 11* | −10.746 | 0.31 | | |
| 12 | ∞ | 0.30 | 1.51633 | 64.14 |
| 13 | ∞ | 0.32 | | |
| Image plane | | | | |

Aspherical surface data

2nd surface k = 0.250
A4 = 7.95342e−03, A6 = −1.27528e−02, A8 = 3.00281e−02
3rd surface k = −464.767
A4 = 6.21930e−02, A6 = −4.63585e−02, A8 = 7.77212e−02
4th surface k = −175.971
A4 = 2.16665e−02, A6 = −8.82342e−02, A8 = 9.43827e−02,
A10 = −4.27755e−02
5th surface k = 1.389
A4 = −7.83921e−02, A6 = 4.16890e−02, A8 = −5.26214e−02,
A10 = 2.33161e−02
6th surface k = 0.000
A4 = −2.12686e−02, A6 = −2.93123e−02, A8 = 4.07694e−02,
A10 = −8.38040e−03
7th surface k = −3.923
A4 = 1.23522e−02, A6 = −5.70700e−02, A8 = −1.53639e−02,
A10 = 1.81990e−02
8th surface k = 1.427
A4 = −6.01029e−02, A6 = 9.64419e−02, A8 = −1.06614e−01,
A10 = 3.50262e−02, A12 = −2.29025e−03
9th surface k = −0.577
A4 = 1.85483e−02, A6 = 7.12409e−02, A8 = −1.79445e−02,
A10 = 2.27696e−03, A12 = 8.09449e−05
10th surface k = −1.661
A4 = 4.64844e−02, A6 = −8.28990e−03, A8 = 8.56243e−04,
A10 = 1.35252e−04, A12 = −1.62567e−05, A14 = −3.36708e−06
11th surface k = −2709.502
A4 = −2.62873e−02, A6 = 2.01195e−03, A8 = −8.80401e−04,
A10 = 2.69088e−05, A12 = 9.46183e−06, A14 = −1.69050e−06

| | |
|---|---|
| BF (in air) | 0.83 |
| Lens total length (in air) | 4.56 |
| Total system focal length | 3.85 |

Aspherical surface data

EXAMPLE 5

Unit mm

Surface data

| Surface no. | r | d | nd | vd |
|---|---|---|---|---|
| Object plane | ∞ | ∞ | | |
| 1(Stop) | ∞ | −0.24 | | |

-continued

Unit mm

| | | | | |
|---|---|---|---|---|
| 2* | 1.699 | 0.58 | 1.53368 | 55.90 |
| 3* | −7.058 | 0.07 | | |
| 4* | 11.931 | 0.42 | 1.61420 | 25.59 |
| 5* | 1.752 | 0.46 | | |
| 6* | 25.807 | 0.62 | 1.54455 | 55.96 |
| 7* | −5.266 | 0.33 | | |
| 8* | −3.753 | 0.49 | 1.54455 | 55.96 |
| 9* | −1.189 | 0.51 | | |
| 10* | −0.978 | 0.33 | 1.53368 | 55.90 |
| 11* | −7.490 | 0.31 | | |
| 12 | ∞ | 0.30 | 1.51633 | 64.14 |
| 13 | ∞ | 0.40 | | |
| Image plane | | | | |

Aspherical surface data

2nd surface k = 0.247
A4 = 4.94043e−03, A6 = −1.31594e−02, A8 = 2.42854e−02
3rd surface k = −167.249
A4 = 5.08501e−02, A6 = −4.23782e−02, A8 = 4.40312e−02
4th surface k = 1.003
A4 = 3.07590e−02, A6 = −7.67965e−02, A8 = 4.99489e−02,
A10 = −1.10357e−02
5th surface k = 1.199
A4 = −7.86092e−02, A6 = 3.22268e−02, A8 = −3.41315e−02,
A10 = 6.66634e−03
6th surface k = 0.000
A4 = −2.24071e−02, A6 = −3.31777e−02, A8 = 5.00376e−02,
A10 = −1.17495e−02
7th surface k = 3.572
A4 = −1.23349e−03, A6 = −5.67000e−02, A8 = −1.22393e−02,
A10 = 1.80614e−02
8th surface k = −0.144
A4 = −8.27357e−02, A6 = 9.56499e−02, A8 = −1.07545e−01,
A10 = 3.47540e−02, A12 = −1.96085e−03
9th surface k = −0.549
A4 = 2.51205e−02, A6 = 7.11776e−02, A8 = −1.90008e−02,
A10 = 2.15991e−03, A12 = 2.98213e−04
10th surface k = −1.967
A4 = 4.26754e−02, A6 = −9.40301e−03, A8 = 1.20210e−03,
A10 = 2.45029e−04, A12 = −5.47881e−05, A14 = −8.08223e−07
11th surface k = −254.860
A4 = −2.31454e−02, A6 = 1.98267e−03, A8 = −9.10680e−04,
A10 = 5.45014e−05, A12 = 1.54330e−05, A14 = −2.59768e−06

| | |
|---|---|
| BF (in air) | 0.92 |
| Lens total length (in air) | 4.73 |
| Total system focal length | 4.09 |

Further, values of the conditional expression are shown below:

| | Conditional expression | Example1 | Example2 | Example3 |
|---|---|---|---|---|
| 1 | f/f5 | −1.91 | −1.92 | −2.06 |
| 2 | (r10 + r11)/(r10 − r11) | −1.31 | −1.29 | −1.23 |
| 3 | (r2 + r3)/(r2 − r3) | −0.78 | −0.78 | −0.81 |
| 4 | (r4 + r5)/(r4 − r5) | 1.51 | 1.51 | 1.48 |
| 5 | (r8 + r9)/(r8 − r9) | 1.86 | 1.86 | 1.83 |
| 6 | f3/f4 | 3.64 | 3.69 | 3.89 |
| 7 | αi | 27.41 | 28.29 | 28.95 |
| A | φmax/2Y | 1.67 | 1.66 | 1.77 |
| B | 1/v2 − 1/v1 | 0.02 | 0.02 | 0.02 |

| | Conditional expression | Example4 | Example5 |
|---|---|---|---|
| 1 | f/f5 | −1.78 | −1.91 |
| 2 | (r10 + r11)/(r10 − r11) | −1.21 | −1.30 |
| 3 | (r2 + r3)/(r2 − r3) | −0.79 | −0.61 |
| 4 | (r4 + r5)/(r4 − r5) | 1.51 | 1.34 |
| 5 | (r8 + r9)/(r8 − r9) | 1.81 | 1.93 |
| 6 | f3/f4 | 3.66 | 2.70 |
| 7 | αi | 25.89 | 28.19 |
| A | φmax/2Y | 1.64 | 1.69 |
| B | 1/v2 − 1/v1 | 0.02 | 0.02 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 11:
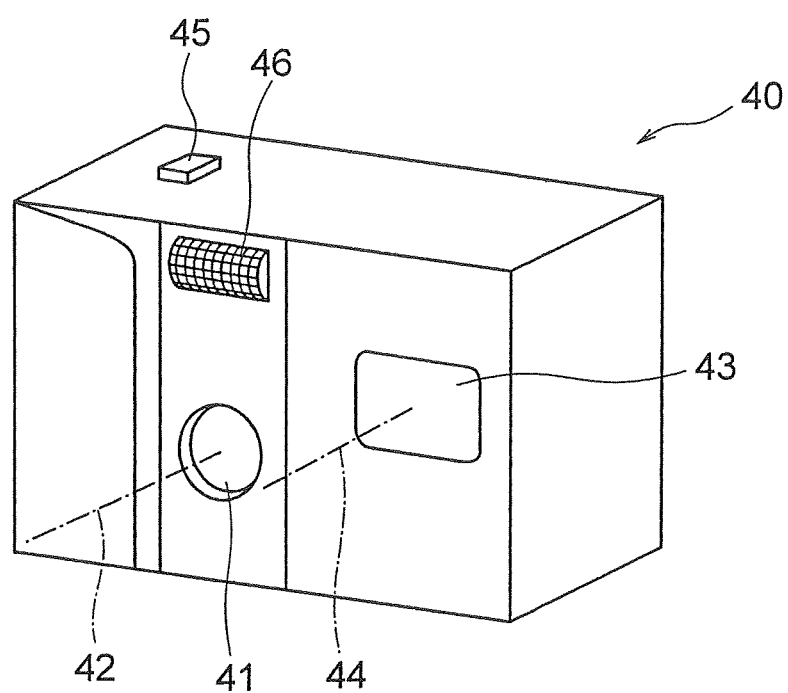
FIG. 11 is a front perspective view showing the appearance of a digital camera 40 in which a zoom optical system according to the present invention is incorporated.
Figure 12:
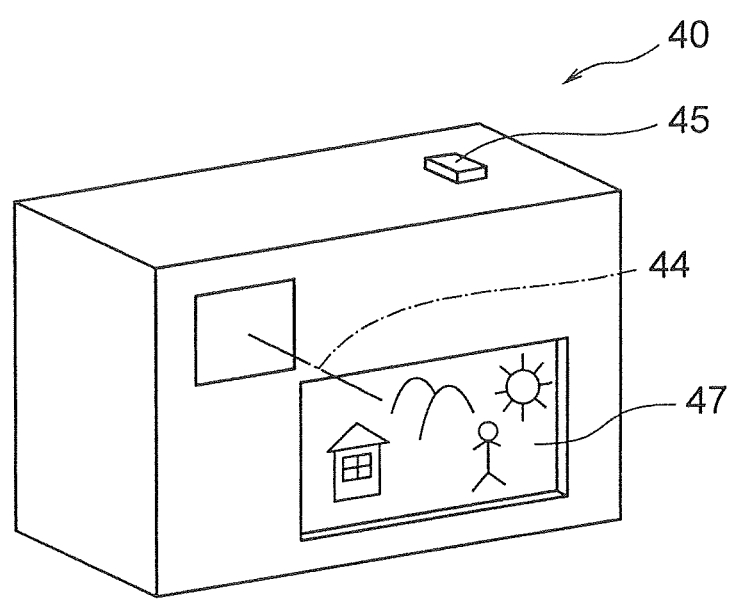
FIG. 12 is a rear perspective view of the digital camera 40.
Figure 13:
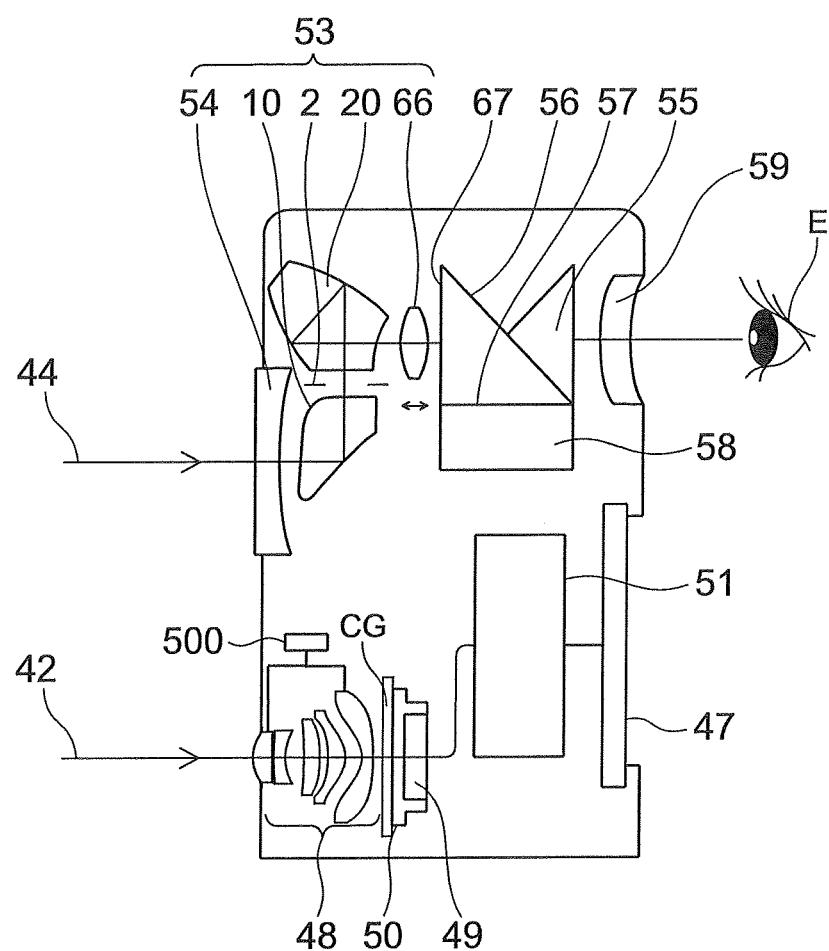
FIG. 13 is a sectional view showing the optical structure of the digital camera 40.

FIG. 11 to FIG. 13 show conceptual diagrams of structures in which the image forming optical system according to the present invention is incorporated in a photographic optical system 41 of a digital camera. FIG. 11 is a frontward perspective view showing an appearance of a digital camera 40, FIG. 12 is a rearward perspective view of the same, and FIG. 13 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Further, the present invention could be applied to the above-mentioned collapsible type digital camera as well as a bending type (an optical path reflecting type) digital camera having a bending optical system (optical path reflecting lens).

Further, the digital camera comprise an autofocus mechanism 500 integrated into the image pickup optical system. If the autofocus mechanism is incorporated, focus can be achieved at all subject object distances.

Further, the objective optical system 100 (the image pickup optical system) and the electronic image pickup chip 162 (the electronic image pickup device) are integrated as a unit.

If the electronic image pickup device is integrated as a unit, an optical image produced by the image pickup optical system can be converted to an electric signal. Further, an electronic image pickup device capable of reducing the variations of the image brightness between the center part and the peripheral part of the image can be selected to provide a compact, high-performance image pickup apparatus.

Figure 14:
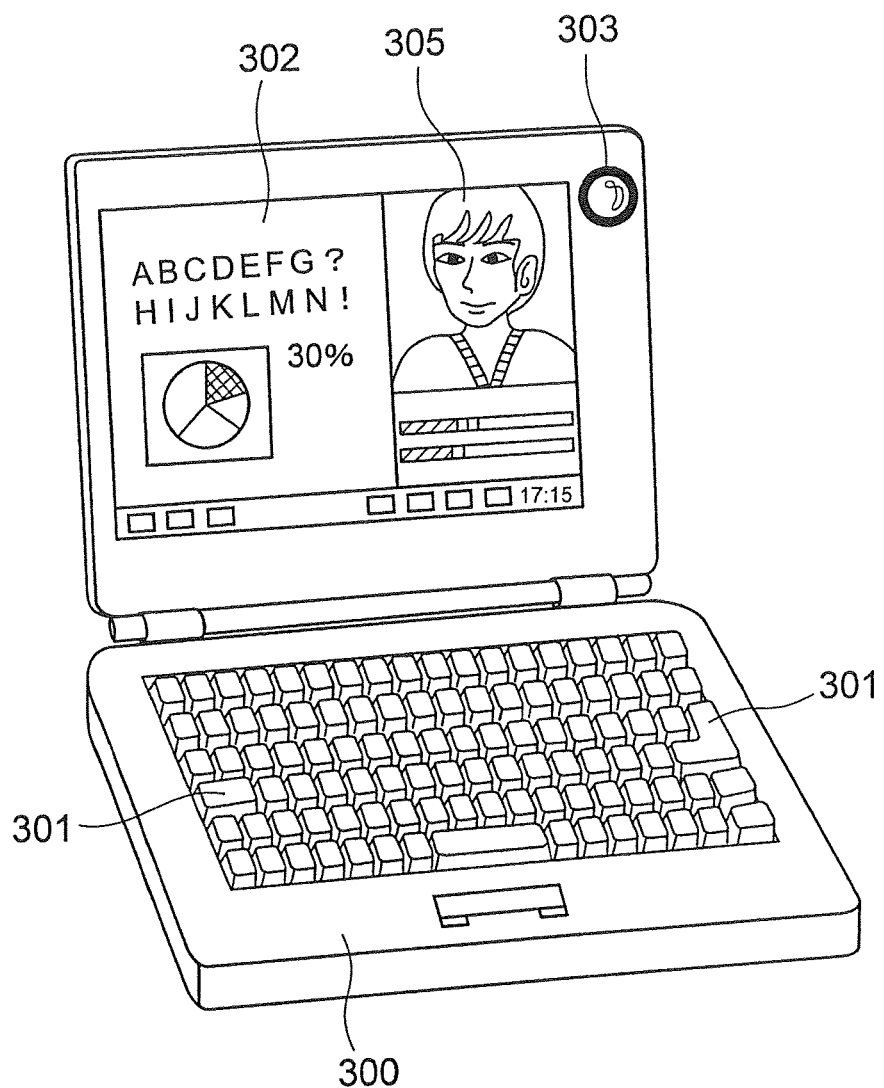
FIG. 14 is a front perspective view of a personal computer 300 with its cover open as an example of an information processing apparatus in which the image pickup optical system of the present invention is incorporated as an objective optical system.
Figure 15:
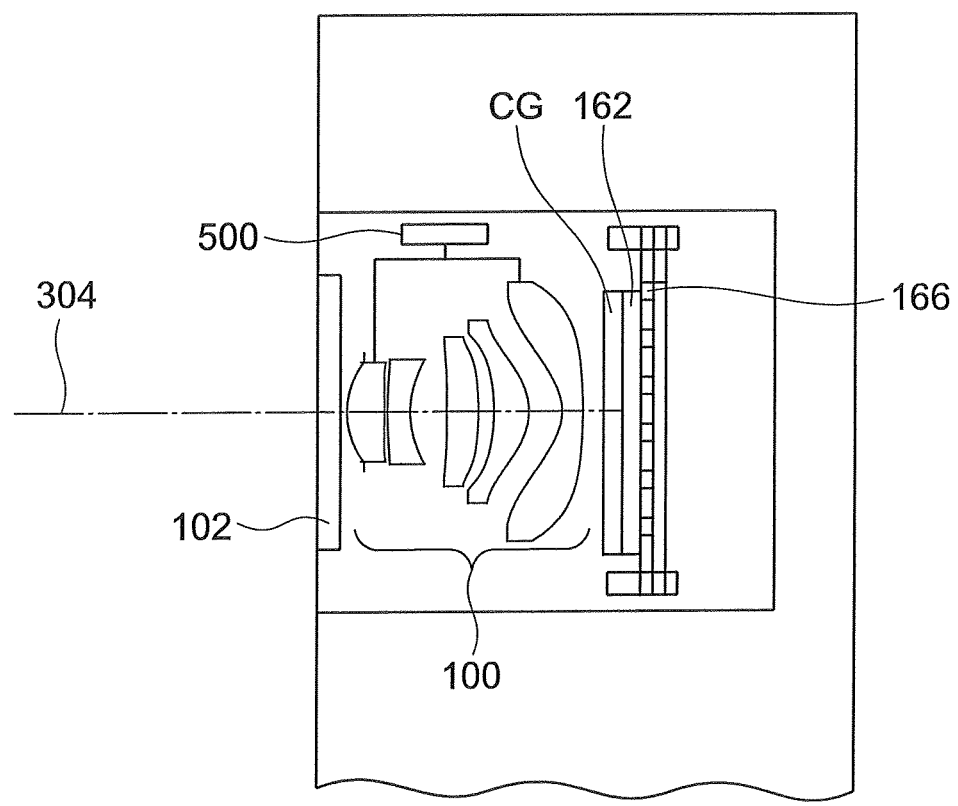
FIG. 15 is a sectional view of a photographing optical system 303 of the personal computer 300.
Figure 16:
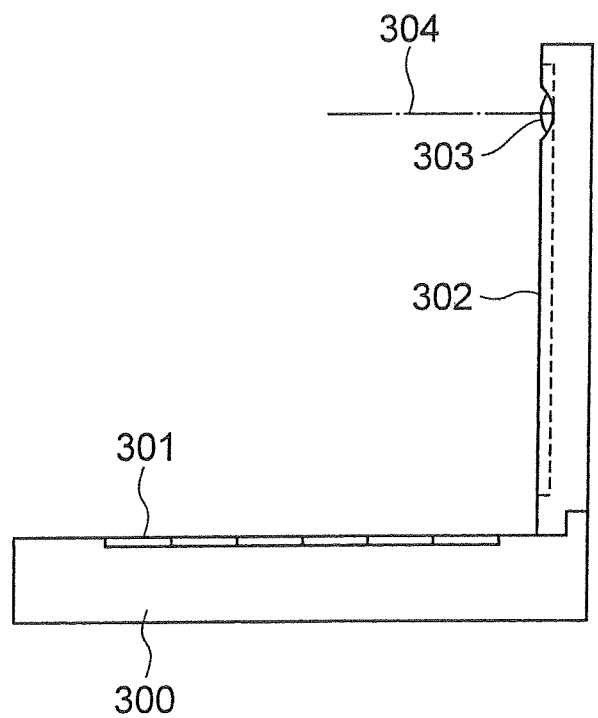
FIG. 16 is a side view of the personal computer 300.

Next, a personal computer which is an example of an information processing apparatus with a built-in image forming system as an objective optical system is shown in FIG. 14 to FIG. 16. FIG. 14 is a frontward perspective view of a personal computer 300 with its cover opened, FIG. 15 is a cross-sectional view of a photographic optical system 303 of the personal computer 300, and FIG. 16 is a side view of FIG. 14. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Further, the personal computer comprise an autofocus mechanism 500 integrated into the image pickup optical system. If the autofocus mechanism 500 is incorporated, focus can be achieved at all subject object distances.

Further, the objective optical system 100 (the image pickup optical system) and the electronic image pickup chip 162 (the electronic image pickup device) are integrated as a unit.

If the electronic image pickup device is integrated as a unit, an optical image produced by the image pickup optical system can be converted to an electric signal. Further, a personal computer (an electronic image pickup device) capable of reducing the variations of the image brightness between the center part and the peripheral part of the image can be selected to provide a compact, high-performance image pickup apparatus.

Figure 17A:
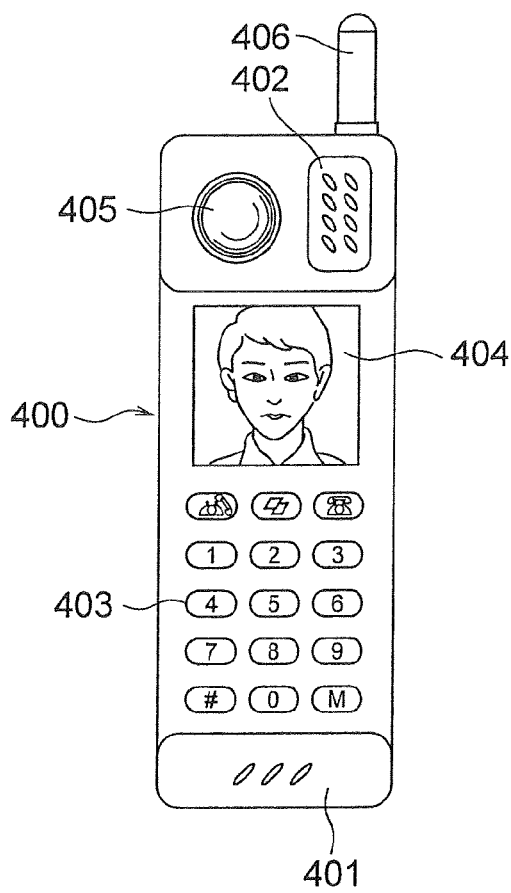
FIGS. 17A, 17B, and 17C are views showing a cellular phone as an example of an information processing apparatus in which the image pickup optical system of the present invention is incorporated as a photographing optical system, where
Figure 17B:
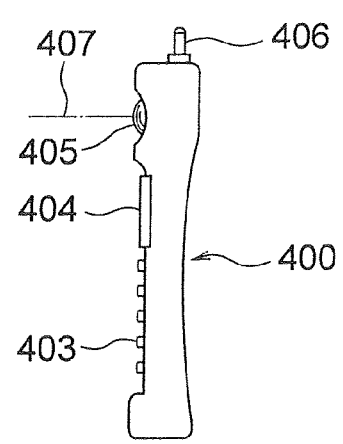
Figure 17C:
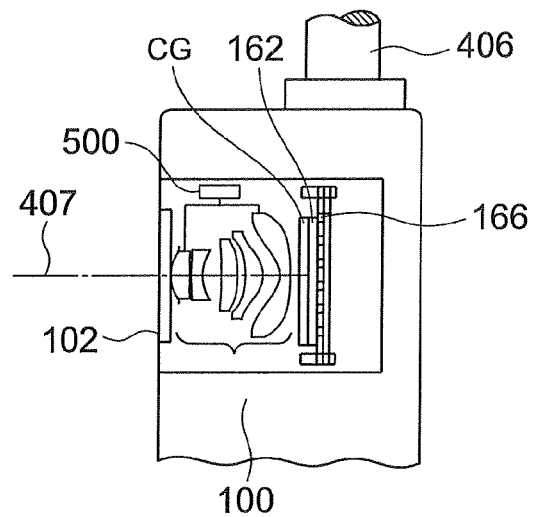

Next, a telephone which is an example of an information processing apparatus in which the image forming optical system of the present invention is built-in as a photographic optical system, particularly a portable telephone which is easy to carry is shown in FIG. 17A, FIG. 17B, and FIG. 17C. FIG. 17A is a front view of a portable telephone 400, FIG. 17B is a side view of the portable telephone 400, and FIG. 17C is a cross-sectional view of a photographic optical system 405. As shown in FIG. 17A to FIG. 17C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Further, the portable telephone comprises an autofocus mechanism 500 integrated into the image pickup optical system. If the autofocus mechanism 500 is incorporated, focus can be achieved at all subject object distances.

Further, the objective optical system 100 (the image pickup optical system) and the electronic image pickup chip 162 (the electronic image pickup device) are integrated as a unit.

If the electronic image pickup device is integrated as a unit, an optical image produced by the image pickup optical system can be converted to an electric signal. Further, a portable telephone (an electronic image pickup device) capable of reducing the variations of the image brightness between the center part and the peripheral part of the image can be selected to provide a compact, high-performance image pickup apparatus.

Various modifications can be made to the present invention without departing from its essence.

As described above, the present invention is useful for an image pickup optical system, in which the maximum effective lens aperture is small and various aberrations are corrected properly.

According to the present invention, there is an advantage of being able to provide an image pickup optical system and an image pickup apparatus having the same, in which various aberrations are corrected properly even if the maximum effective lens aperture is small.

What is claimed is:

1. An image pickup optical system comprising, in order from an object side,
a first lens having a positive refractive power,
a second lens having a negative refractive power,
a third lens having a positive refractive power,
a fourth lens having a positive refractive power,
a fifth lens having a negative refractive power, which is formed into a meniscus shape on an optical axis and having its concave surface facing toward the object side, and an aperture located on the most object side,
wherein the following conditional expression (5) is satisfied:

$$1<(r8+r9)/(r8-r9)<2.7 \quad (5)$$

where
r8 is a paraxial radius of curvature of an object side surface of the fourth lens, and
r9 is a paraxial radius of curvature of an image side surface of the fourth lens.

2. The image pickup optical system according to claim 1, wherein the following conditional expression (1) is satisfied:

$$-4.2<f/f5<-0.8 \quad (1)$$

where
f5 is a focal length of the fifth lens, and
f is a focal length of the entire image pickup optical system.

3. The image pickup optical system according to claim 1, wherein the following conditional expression (2) is satisfied:

$$-2.7<(r10+r11)/(r10-r11)<-0.6 \quad (2)$$

where
r10 is a paraxial radius of curvature of an object side surface of the fifth lens, and
r11 is a paraxial radius of curvature of an image side surface of the fifth lens.

4. The image pickup optical system according to claim 1, wherein the first lens is a biconvex lens.

5. The image pickup optical system according to claim 1, wherein the following conditional expression (3) is satisfied:

$$-1 < (r2+r3)/(r2-r3) < -0.59 \qquad (3)$$

where r2 is a paraxial radius of curvature of an object side surface of the first lens, and r3 is a paraxial radius of curvature of an image side surface of the first lens.

6. The image pickup optical system according to claim 1, wherein the second lens is a meniscus lens facing its convex surface toward the object side.

7. The image pickup optical system according to claim 1, wherein the following conditional expression (4) is satisfied:

$$1 < (r4+r5)/(r4-r5) < 2 \qquad (4)$$

where r4 is a paraxial radius of curvature of an object side surface of the second lens, and r5 is a paraxial radius of curvature of an image side surface of the second lens.

8. The image pickup optical system according to claim 1, wherein the fourth lens is a meniscus lens facing its concave surface toward the object side.

9. The image pickup optical system according to claim 1, wherein the following conditional expression (6) is satisfied:

$$1.3 < f3/f4 < 7.8 \qquad (6)$$

where f3 is a focal length of the third lens, and f4 is a focal length of the fourth lens.

10. The image pickup optical system according to claim 1, wherein the first lens, the second lens, the third lens, the fourth lens, and the fifth lens in the image pickup optical system are all made of resin.

11. An image pickup apparatus comprising the image pickup optical system according to claim 1, and an electronic image pickup device having an image pickup plane, wherein the following conditional expression (7) is satisfied:

$$15° < \alpha i < 30° \qquad (7)$$

where αi is an angle of incidence of a principle ray onto the image pickup plane in the case of the maximum image height.

12. The image pickup apparatus according to claim 11, further comprising an autofocus mechanism integrated into the image pickup optical system.

13. The image pickup apparatus according to claim 11, wherein the image pickup optical system and the electronic image pickup device are integrated as a unit.

\* \* \* \* \*